US011936717B2

(12) United States Patent
Chen et al.

(10) Patent No.: US 11,936,717 B2
(45) Date of Patent: Mar. 19, 2024

(54) SCALABLE MEDIA FILE TRANSFER

(71) Applicant: NETFLIX, INC., Los Gatos, CA (US)

(72) Inventors: Shunfei Chen, Sunnyvale, CA (US); Christopher Ginter, San Jose, CA (US); Victor Yelevich, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/528,028

(22) Filed: Nov. 16, 2021

(65) Prior Publication Data

US 2023/0156070 A1 May 18, 2023

(51) Int. Cl.
| | |
|---|---|
| *H04L 67/06* | (2022.01) |
| *G06F 21/64* | (2013.01) |
| *H04L 1/08* | (2006.01) |
| *H04L 67/1074* | (2022.01) |

(52) U.S. Cl.
CPC .............. *H04L 67/06* (2013.01); *G06F 21/64* (2013.01); *H04L 1/08* (2013.01); *H04L 67/108* (2013.01)

(58) Field of Classification Search
CPC ......... H04L 67/06; H04L 67/108; H04L 1/08; G06F 21/64
USPC .................................................. 709/217, 218
See application file for complete search history.

(56) References Cited

U.S. PATENT DOCUMENTS

| | | | | |
|---|---|---|---|---|
| 2002/0087716 A1* | 7/2002 | Mustafa | ................... | H04L 49/90 |
| | | | | 709/236 |
| 2003/0053475 A1* | 3/2003 | Veeraraghavan | ....... | H04L 67/06 |
| | | | | 370/431 |
| 2005/0078604 A1* | 4/2005 | Yim | ........................ | H04L 69/16 |
| | | | | 709/227 |
| 2006/0104288 A1* | 5/2006 | Yim | ...................... | H04L 63/029 |
| | | | | 370/395.52 |
| 2006/0227773 A1* | 10/2006 | Grewal | ................. | H04L 63/123 |
| | | | | 713/150 |
| 2009/0013356 A1* | 1/2009 | Doerr | ................ | H04N 21/41407 |
| | | | | 725/62 |
| 2011/0078355 A1* | 3/2011 | Tan | ...................... | G06F 13/4273 |
| | | | | 710/305 |

(Continued)

FOREIGN PATENT DOCUMENTS

WO      01/54370 A2      7/2001

OTHER PUBLICATIONS

Why big data overwhelms enterprise networks, "Finding a better big data transport solution", 7 pages.

(Continued)

*Primary Examiner* — Thu T Nguyen
(74) *Attorney, Agent, or Firm* — Artegis Law Group, LLP

(57) ABSTRACT

Various embodiments of the present application set forth a computer-implemented method comprising determining a set of digital assets to transfer to a destination device, generating, from the set of digital assets, a corresponding set of chunks, where each chunk is a pre-defined size, for each chunk in the set of chunks, transmitting the chunk to a service node included in a set of service nodes, and verifying that the service node received the chunk, where the set of service nodes receives at least two chunks of the set of chunks in parallel, and after the set of service nodes send the at least two chunks in parallel to the destination device, verifying that the destination device received the set of chunks.

20 Claims, 8 Drawing Sheets

(56) References Cited

U.S. PATENT DOCUMENTS

| | | | |
|---|---|---|---|
| 2011/0136439 A1* | 6/2011 | Tan | H04W 24/08 455/67.11 |
| 2016/0212507 A1* | 7/2016 | Du | H04Q 9/00 |
| 2017/0054702 A1* | 2/2017 | Turgeman | G06F 21/31 |
| 2017/0272209 A1* | 9/2017 | Yanovsky | G06F 12/0253 |
| 2018/0048567 A1* | 2/2018 | Ignatchenko | H04L 1/00 |
| 2018/0139131 A1* | 5/2018 | Ignatchenko | H04L 43/10 |
| 2019/0141567 A1* | 5/2019 | Liu | H04L 69/04 |
| 2019/0199427 A1* | 6/2019 | Zakaria | H04B 7/18543 |
| 2020/0273040 A1* | 8/2020 | Novick | G06Q 20/10 |
| 2021/0058989 A1* | 2/2021 | Simsek | H04L 47/283 |
| 2023/0156070 A1* | 5/2023 | Chen | H04N 21/64322 709/217 |
| 2023/0328308 A1* | 10/2023 | Marciano | H04N 21/43072 725/131 |

OTHER PUBLICATIONS

IBM Cloud White Paper, IBM Aspera FASP High-Speed transport a critical technology comparison to alternative TCP-based transfer technologies, 13 pages.

International Search Report for Application No. PCT/US2022/079853 dated Mar. 1, 2023.

Lek et al., "Cloud-to-Cloud Parallel Data Transfer via Spawning Intermediate Nodes", IEEE Region 10 Conference, DOI:10.11 09/TENCON.2017.8227943, Nov. 5, 2017, pp. 657-661.

Pyeon et al., "An Efficient Multi-Path Pipeline Transmission for a Bulk Data Transfer In IEEE 802.15.4 Multi-Hop Networks", https://doi.org/10.1007/s11276-017-1542-x, vol. 25, No. 1, Jun. 20, 2017, pp. 117-130.

Panahi et al., "A Novel Schema for Multipath Video Transferring over Ad Hoc Networks", The Second International Conference on Mobile Ubiquitous Computing, Systems, Services and Technologies, DOI 10.11 09/UBICOMM.2008.60, Sep. 29, 2008, pp. 77-82.

Wang et al., "R2T: A Rapid and Reliable Hop-by-Hop Transport Mechanism for Information-Centric Networking", DOI:10.11 09/ACCESS.2018.2808296, vol. 6, Feb. 20, 2018, pp. 15311-15325.

Li et al., "An Adaptive Retransmission-Based Multipath Transmission Mechanism for Conversational Video", International Journal of Communication Systems, DOI: 10.1002/DAC.3778, vol. 31, No. 15, 2018, pp. 1-14.

Arzani et al., "Sunstar: A Cost-effective Multi-Server Solution for Reliable Video Delivery", Dec. 1, 2018, 14 pages.

* cited by examiner

SCALABLE MEDIA FILE TRANSFER

BACKGROUND

Field of the Various Embodiments

Embodiments of the present disclosure relates generally to distributed computing systems and, more specifically, to scalable media file transfer.

Description of the Related Art

Distributed computing systems include many different hardware and software components that operate to provide a variety of services to clients of the distributed computing system. For example, one distributed computing system executing video production services could provide a group of users the ability to collaborate by generating, modifying, and storing various media assets that combine to form an audiovisual program. In such instances, the distributed computing system could enable various endpoint devices to access files and objects that are stored within one or more endpoint data stores, such as object storage services (OSS) or file storage services.

In various instances, the media assets may be stored as separate files. For example, a given audiovisual program, such as a film, may be stored as a group of separate files. More particularly, each frame of video may be stored as a separate file, the audio data may be stored as a file, and metadata and other related data may also be stored in separate files. In some circumstances, a given media asset may be stored in a large number of separate files, such as hundreds of thousands of separate files.

In order to access media assets, file transfer services enable users to queue a series of files for transfer to a target location, such as a networked repository. For example, when a user completes tasks associated with modifying one or more media assets, the user may use a file transfer service application to queue the applicable files for transfer to the endpoint data store. However, various conventional file transfer techniques are unreliable and time-consuming and require significant processing, memory, and storage resources at the endpoint device. For example, some conventional file transfer services use a lossy protocol that does not ensure that a transferred file is complete and not corrupt. Further, some conventional file transfer services connect only to a single endpoint data store and are limited by the resources of the data store to receive thousands of separate files that a user places in a transfer queue.

As the foregoing illustrates, what is needed in the art is a more effective technique to reliably transfer large volumes of media files within a distributed computing system.

SUMMARY

Various embodiments of the present application set forth a computer-implemented method comprising determining a set of digital assets to transfer to a destination device, generating, from the set of digital assets, a corresponding set of chunks, where each chunk is a pre-defined size, for each chunk in the set of chunks, transmitting the chunk to a service node included in a set of service nodes, and verifying that the service node received the chunk, where the set of service nodes receives at least two chunks of the set of chunks in parallel, and after the set of service nodes send the at least two chunks in parallel to the destination device, verifying that the destination device received the set of chunks.

Other embodiments include, without limitation, a computer system that performs one or more aspects of the disclosed techniques, as well as one or more non-transitory computer-readable storage media including instructions for performing one or more aspects of the disclosed techniques.

At least one technological advantage of the disclosed techniques is that the scalable transfer agent enables devices within a distributed computing network to transfer large volumes of data with great speed and reliability. In particular, generating a set of separate chunks and handling each chunk as a separate file enables the distributed computing system to parallelize transferring the set of chunks to one or more destination nodes associated with a recipient. Further, generating checksums for each chunk enables recipient devices to verify that a given chunk is complete and not-corrupt. This verification allows the disclosed techniques to employ high data integrity while limiting the amount of data that the sender needs to resend when a checksum cannot be successfully authenticated. These technological advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
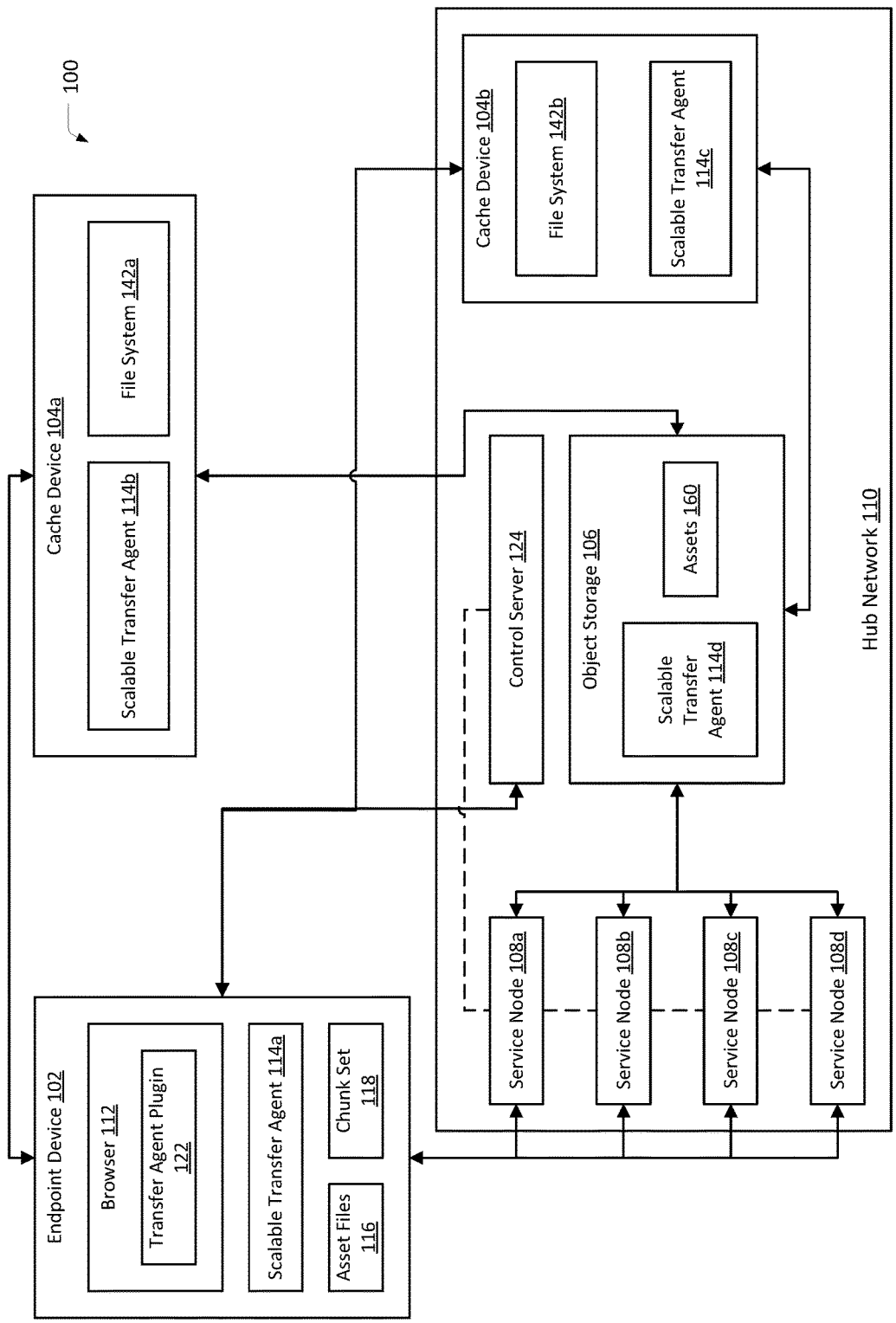
FIG. 1 illustrates a network infrastructure configured to implement one or more aspects of the present disclosure.

In the following description, numerous specific details are set forth to provide a more thorough understanding of the various embodiments. However, it will be apparent to one skilled in the art that the inventive concepts may be practiced without one or more of these specific details.

Overview

Distributed computing systems include many different hardware and software components that operate to provide a variety of services to clients of the distributed computer systems. A distributed computing system executing video production services could provide users with the ability to retrieve and update assets that are stored in remote storage services. For instance, a user may download various media asset files to local storage for use with various digital content creation applications and may upload the updated media files to the remote storage service upon completing various tasks. Therefore, transferring assets between devices within the distributed computing system is an important component of video production.

Prior art techniques for transferring digital assets are time-consuming and unreliable. For example, some techniques provide fast data transfers between devices. However, such techniques use lossy transfer protocols that do not ensure the integrity of data being transferred, resulting in incomplete or corrupt data being received at the destination device and may degrade a digital asset. For example, an audiovisual program may store a video as a series of individual frames. An audiovisual program therefore may be stored in the remote storage service as a large volume of files (for example, approximately 500,000 files for a 1-hour video). A lossy transfer of the audiovisual program may therefore result in a large quantity of missing or corrupt files and result in the audiovisual program losing frames, degrading the final audiovisual program. Further, when transferring a large file (e.g., a single 10 GB RAW video file) using a lossy transfer protocol, the large file may not be successfully received by the destination device. The sending device would therefore need to resend the entire large file, which results in a time-consuming transfer and requires a large amount of processing and network resources to transfer the file.

In various embodiments, a scalable transfer agent included in devices of the distributed computing system manages the transfer of a set of assets, ranging from a single file to hundreds-of-thousands of files, between a sender device and a destination device. The scalable transfer agent identifies the assets to be transferred and separates the assets into a set of chunks of a pre-defined size. The scalable transfer agent coordinates with a cluster of service nodes to transfer multiple chunks in parallel to different service nodes. The service nodes and the scalable transfer agent verify that each chunk was successfully received by the service node by computing checksum values for each chunk. A non-matching checksum value causes the sender device to resend the corresponding chunk. The service nodes transfer the set of chunks to the destination device, where the destination device and service nodes further verify that the destination device successfully received the set of chunks. Upon receiving the set of chunks, the destination device combines the chunks and stores the assets included in the chunks in storage at the destination device.

Advantageously, the scalable transfer agent addresses various limitations of distributed file transfer techniques. More specifically, conventional distributed file transfer techniques that used lossless protocols were inefficient, as such techniques required limited transmission of subsequent packets until the sender received an indication that an initial packet was successfully received. Other conventional distributed file transfer techniques that used lossy protocols were ineffective at transferring large volumes of data, as the destination device would receive incomplete or corrupt files. Such techniques would either have the destination device only receive the incomplete or corrupt file, or require the sender device to retransmit large volumes of data over the network, occupying networking and processing resources of the distributed network. By contrast, the scalable transfer agent enables a scalable transfer of data between nodes by efficiently grouping separate files that are to be transferred into a set of separate chunks and separately sending and verifying the successful transfer of each chunk. Transmitting multiple chunks in parallel speeds the transfer of data through the use of multiple nodes that separately receive and process the chunks. Further, by separately verifying individual chunks, the scalable transfer agent can minimize the data that is retransmitted to the destination device without impeding the transfer of other portions of the data that is transferred to the destination device.

System Overview

FIG. 1 illustrates a network infrastructure configured to implement one or more aspects of the present disclosure. As shown, the distributed computing system 100 includes, without limitation, an endpoint device 102, cache devices 104 (e.g., 104a, 104b, etc.), and a hub network 110. The hub network 110 includes an object storage 106, service nodes 108 (e.g., 108a, 108b, etc.), and a control server 124. The endpoint device 102 includes a browser 112, a scalable transfer agent 114 (e.g., 114a, 114b, etc.), asset files 116, a chunk set 118, and a transfer agent plugin 122. The cache device 104 includes a file system 142 (e.g., 142a, 142b).

For explanatory purposes, multiple instances of like objects are denoted with reference numbers identifying the object and additional letters identifying the instance where needed. Further, the distributed computing system 100 includes multiple instances of devices, even when not shown. For example, the distributed computing system 100 could include multiple endpoint devices 102 (e.g., 102a, 102b, etc.), control servers 124 (e.g., 124a, 124b, etc.), and/or assets 160 (e.g., 160a, 160b, etc.) and still be within the scope of the disclosed embodiments.

In operation, a scalable transfer agent 114 at a sender device (e.g., the scalable transfer agent 114a and/or the transfer agent plugin 122) receives an indication of a set of asset files 116 that are to be transferred to a destination device. The scalable transfer agent 114 separates the set of asset files 116 to generate a chunk set 118 that includes separate chunks of a pre-defined size. The scalable transfer agent 114a identifies a set of service nodes 108 (e.g., the service nodes 108a-108d) that are to receive individual chunks from the chunk set 118 and transmits separate chunks to multiple service nodes in the set of service nodes 108 in parallel. The scalable transfer agent 114 and a given service node 108 separately compute a checksum value for a given chunk, where matching checksum values for the chunk verify that the service node 108 has successfully received the given chunk. The set of service nodes transfer the set of chunks to the destination device, where the destination device computes checksum values for each chunk, where matching checksum values for the chunk verify that the destination device has successfully received the given chunk.

The endpoint device 102 includes one or more processors and memory subsystems. The processor may run user processes (e.g., the scalable transfer agent 114a, the browser 112, the transfer agent plugin 122, etc.) that enable the user to complete various tasks. The endpoint device 102 is connected to the hub network 110 via one or more communications channels that transport large files, objects, and/or other messages between components. For example, the scalable transfer agent 114a could communicate with the object storage 106, the cache device 104a, the cache device 104b, etc. in order to transfer files or objects via streaming and/or download.

Scalable transfer agent 114 (e.g., 114a, 114b, etc.) enables the transfer of assets 160 and/or asset files 116 between devices (e.g., the endpoint device 102, the cache devices 104, the object storage 106) in the distributed computing system 100. In various embodiments, the scalable transfer agent 114 generates a chunk set 118 corresponding to a set of asset files 116 to be transferred. The scalable transfer agent 114 then manages multiple threads to enable parallel processing and transferring of separate chunks to a destination device (e.g., the object storage 106) via multiple service nodes 108.

In various embodiments, the scalable transfer agent 114 may track each asset file 116 as the asset file 116 is transferred to the recipient. For example, the scalable transfer agent 114a operating on the endpoint device 102 could generate a tracking token corresponding to each asset file 116. The scalable transfer agent 114a could maintain a tracking table and/or tracking database that tracks the location of each tracking token, indicating the location of the corresponding asset file 116. In such instances, the scalable transfer agent 114a may persist the asset file 116 locally until the scalable transfer agent 114a confirms that the asset file 116 has been successfully written to disk at the recipient. In some embodiments, the scalable transfer agent 114 may persist each asset file 116 and persist each asset file 116 at the sender device 302 in order to enable the sender 302 to pause and resume the transfer of particular asset files 116 over multiple sessions. In such instances, the scalable transfer agent 114 may determine which assets files 116 have not been successfully received by the destination device based on the contents of the tracking table and/or tracking database and may resume the transfer of the set of assets by retransmitting the asset files 116.

In some embodiments, the scalable transfer agent 114 may communicate with a key store that includes one or more keys used by one or more users and/or devices in order to access encrypted asset files 116 and/or secure data stores. For example, the scalable transfer agent 114 could include one or more keys that are necessary to access one or more portions of a secure portion of the object storage 106. In such instances, the control server 124 may communicate with the scalable transfer agent 114 to authorize and/or authenticate the endpoint device 102 and enable the endpoint device 102 to download an asset 160 and/or an asset file that is stored in the secure portion of the object storage 106.

Browser 112 is an application operating on the endpoint device 102 that enables the endpoint device 102 to run various web services. For example, the endpoint device 102 could execute the browser 112 to send HTTP requests to a server to execute a web service. In some embodiments, the endpoint may include a transfer agent plugin 122 to operate within a browser 112. In such instances, the transfer agent plugin 122 may be a plugin, such as a JavaScript plugin, that includes the same functionalities as the scalable transfer agent 114. In some embodiments, the transfer agent plugin 122 may use the resources provided via the browser 112 in order to manage the transfer of the chunk set 118 to the destination device. In such instances, the processing and resources provided via the browser 112 may be more limited than the resources available to the scalable transfer agent 114 that operates as an application separate from the browser 112.

Asset files 116 are one or more files that correspond to a given asset 160. For example, a video asset may include multiple image files, audio files, metadata files (e.g., manifest files, authentication tokens, structural metadata files, etc.), and so forth. In various embodiments, devices in the distributed computing system 100 may store asset files 116 and/or assets 160. For example, the object storage 106 could store one or more assets 160 as objects. In another example, the cache devices 104 could store asset files 116 as files in the file system 142.

Chunk set 118 is a set of data blocks ("chunks") that the scalable transfer agent 114 separately manages. In various embodiments, the chunk set may be a contiguous sequence of asset files, where each chunk includes separate data. In some embodiments, the scalable transfer agent 114 may initially group the set of asset files 116 that are to be transferred into a data block. The scalable transfer agent 114 may then split the data block into separate chunks that are included in the chunk set. In some embodiments, the scalable transfer agent 114 may use multiple processing threads to process separate chunks from the chunk set in parallel and transmit the chunks to separate service nodes 108.

Cache device 104 (e.g., 104a, 104b, etc.) is a device that stores one or more asset files 116 in file system 142, In various embodiments, the cache device 104 may coordinate with other devices in the distributed computing system 100 in order to transfer asset files to be stored in the file system (e.g., receiving asset files 116 from the endpoint device 102) or to be stored in centralized storage (e.g., transmitting asset files 116 to the object storage 106). In some embodiments, the cache device 104 may be proximately located to the endpoint device 102. For example, cache device 104a may be an on-premises device that provides large-capacity storage for the endpoint device 102. In some embodiments, cache device 104 may operate within the hub network 110. For example, cache device 104 may communicate with one or more remote workstation instances (not shown) and provide asset files 116 to the remote workstation instances.

Hub network 110 includes network communications components, such as routers and switches, configured to facilitate data communication between devices included in hub network 110 and other devices included in the distributed computing system 100. Persons skilled in the art will recognize that many technically-feasible techniques exist for building the hub network 110, including technologies practiced in deploying the well-known internet communications network. For example, the hub networks 110 may include a wide-area network (WAN), a local-area network (LAN), and/or a wireless (Wi-Fi) network, among others. In various embodiments, one or more communications protocols, such as transmission control protocol (TCP), internet protocol (IP), and/or user datagram protocol (UDP) may be employed to transport messages and/or media data (e.g., asset files 116 and/or assets 160) between devices in the distributed computing system 100.

Service nodes 108 (e.g., 108a, 108b, etc.) include one or more transfer servers that manage the transfer of data with one or more devices (e.g., the endpoint device 102, the cache devices 104, the object storage 106, etc.). The service nodes 108 employ a transfer protocol to transfer data via one or more messages between devices. In various embodiments, one or more service nodes 108 may operate within a single region ("cluster") or for a specific client. In some embodiments, the number of service nodes 108 may scale. For example, a transfer server may provision multiple service node instances 108. In some embodiments, the service node 108 may include temporary storage, such as storage in a data center, the cloud, or a private cloud (not shown) to temporarily store data before transferring data to other storage (e.g., the endpoint device 102, the cache devices 104, the object storage 106, etc.). In some embodiments, the service nodes 108 may communicate with the control server 124 to indicate various performance metrics (e.g., CPU core frequency, latency, bandwidth, etc.).

Control server 124 may manage the one or more devices in the distributed computing system 100. In various embodiments, the control server 124 may manage the set of service nodes 108 that are provided to the scalable transfer agent 114 in order to transfer the chunk set 118 between devices. In various embodiments, the control server 124 may collect and distribute load information in order to provide load balancing functions for the service nodes 108. In some embodiments, the control server 124 may manage the authentication of the scalable transfer agent 114 when the scalable transfer agent 114 is handling encrypted data.

In various embodiments, the object storage 106 may include, for example, one or more devices, such as one or more web servers, that store data from a plurality of sources. In various embodiments, the object storage 106 may be an online storage service (e.g., Amazon® Simple Storage Service (S3), Google® Cloud Storage, etc.) in which a catalog of thousands or millions of files and/or objects is stored and/or accessed. In some embodiments, the object storage 106 also may provide computing and/or other processing services. In various embodiments, the object storage 106 may permanently store one or more assets 160 associated with an audiovisual program. For example, an audiovisual program may be encoded as different versions, with each version of the audiovisual program being stored as a separate object.

In various embodiments, a user of the endpoint device 102 may be authorized to access a specific set of assets 160. The set of assets 160 that are accessible to the user may be a subset of assets 160 stored within the object storage 106. For example, a system administrator or service within network infrastructure (e.g., a workflow manager) could grant the user permission to access a subset of the content items stored in the object storage 106. In some embodiments, the set of assets 160 and/or asset files 116 for an asset 160 may be associated with each other through hierarchical permissions. For example, a given asset 160 (e.g., an animated chair) may have a set of linked component content items (e.g., wire frame, textures, sound effects, etc.) stored as asset files 116. In such cases, granting the user access to the given asset 160 may also, through the hierarchical permissions, grant access to one or more of the component asset files 116. A manifest file identifying the permitted asset files 116 for the user may be updated to include the hierarchy of component items to which the user has access.

Scalable Media File Transfer

Figure 2:
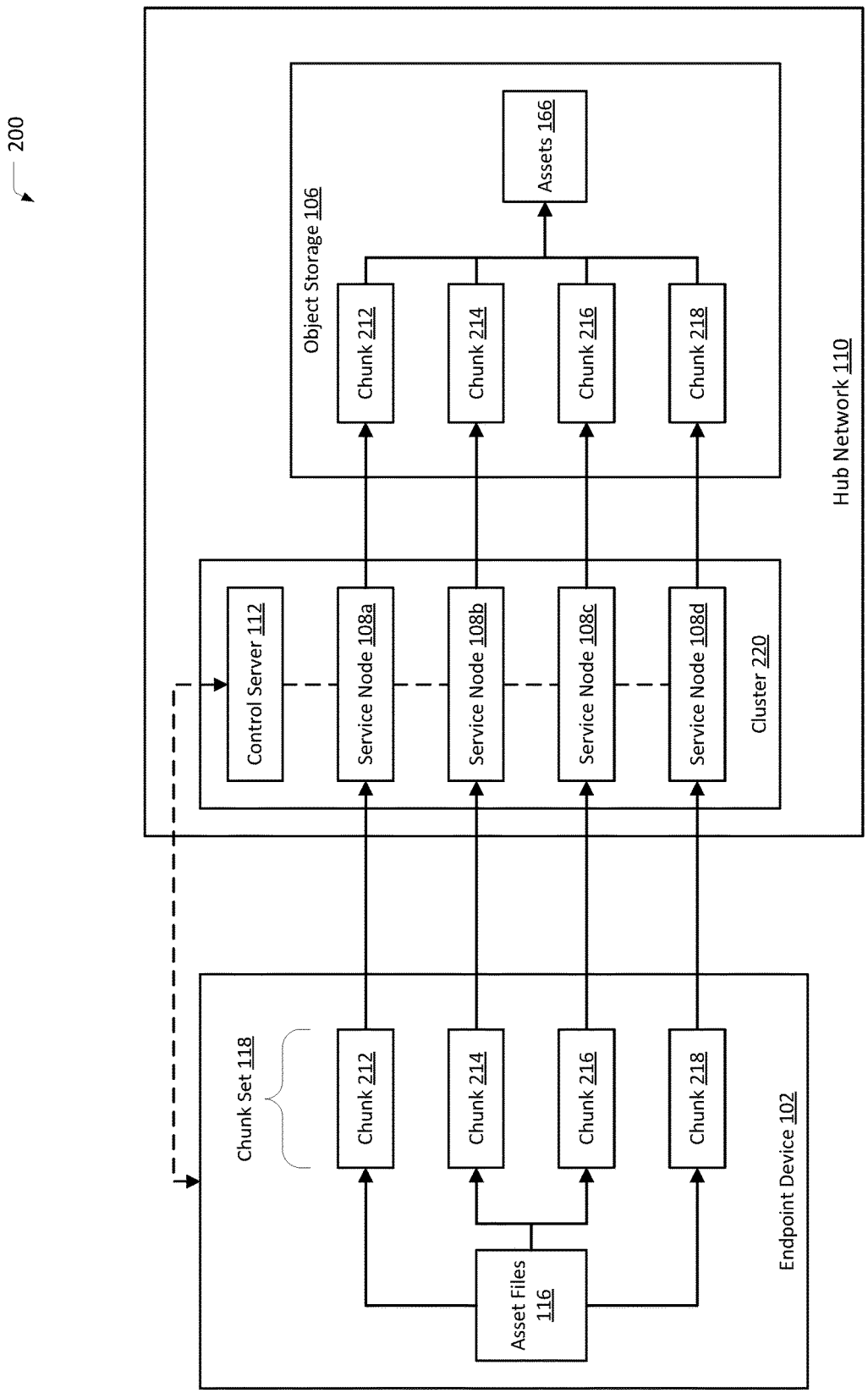
FIG. 2 illustrates a technique of transmitting a set of files from a sender to a recipient using a plurality of service nodes included in the example distributed computing system of FIG. 1, according to various embodiments of the present disclosure.

FIG. 2 illustrates a technique of transmitting a set of files from a sender to a recipient using a plurality of service nodes included in the example distributed computing system of FIG. 1, according to various embodiments of the present disclosure. As shown, and without limitation, the network infrastructure 200 includes an endpoint device 102 and a hub network 110. The endpoint device 102 includes separate chunks 212-218 included in a chunk set 118. The hub network 110 includes a cluster 220 that includes a control server 124 and service nodes 108 (e.g., nodes 108a-108d). The hub network further includes object storage 106 that includes the chunks 212-218.

In operation, the endpoint device 102 acts as a sender that transmits a set of asset files 116 to the object storage 106, where corresponding assets 166 are written to disk and stored. A transfer agent, such as the scalable transfer agent 114a or the transfer agent plugin 122, causes the set of asset files 116 to be split into pre-defined chunks 212-218. For each chunk 212-218, the transfer agent identifies a specific service node 108 that is to receive the chunk. The transfer agent causes each chunk 212-218 in the chunk set 118 to be transmitted to a service node 108 in the cluster 220. In various embodiments, each of the service nodes 108 in the cluster 220 verify that the respective chunks 212-218 were successfully received. The cluster 220 transfers the chunks 212-218 to storage at a recipient. In various embodiments, the recipient verifies that the entire chunk set 118 was successfully written to disk. The recipient then converts the chunks 212-218 in the chunk set 118 to an applicable form for storage (e.g., assets 166 stored as objects in object storage, asset files 116 stored as files in a file system 142, etc.).

In various embodiments, a transfer agent at the sender may generate a chunk set for transmission. While FIG. 2 illustrates an endpoint device 102 uploading asset files for storage in object storage 106, other embodiments of data transfer are applicable, such as the object storage 106 providing assets to the endpoint device 102 in response to a download request, transferring asset files from a file system 142 included in a cache device 104 to the object storage or another data store, and so forth. In such instances, the scalable transfer agent 114 at the sender may generate a set of chunks for transmission and may track each of the chunks in order to ensure that the transmission is successfully completed.

In various embodiments, when uploading assets for storage, the scalable transfer agent 114 operating on the sender (e.g., the scalable transfer agent 114a or the transfer agent plugin 122 on the endpoint device 102) may identify a set of asset files 116 and may generate a data block corresponding to the set of asset files 116. For example, a user may add a group of asset files 116 (e.g., 150,000 files corresponding to frames and associated files for a 40-minute video) to a queue for transmission from local storage on the endpoint device 102 to storage as assets 160 in the object storage 106. The scalable transfer agent 114 may group the asset files 116 into a contiguous data block (not shown) and generate a chunk set 118 that includes a group of chunks 212-218 of a pre-defined size (e.g., approximately 150 separate 64 MB-size chunks for a 10 GB data block). In some embodiments, the scalable transfer agent 114 may queue the set of asset files 116 based on a specific priority, such as prioritizing a specific type of file to the head of the queue (e.g., moving manifest files and other metadata to the head of the queue before various media files or other data files).

In some embodiments, the data block may comprise data from a single file (e.g., a raw 10 GB video file). In such instances, the scalable transfer agent 114 may cause the single file to be split into the chunk set 118. In various embodiments, the pre-defined chunk size may be based on factors such as the location of the cluster 220, available load of the cluster 220, performance factors associated with the cluster 220, and so forth. For example, the scalable transfer agent 114 may vary the pre-defined size for chunks 212-218 to a range of 64 MB to 1 GB in size.

For each respective chunk 212-218 in the chunk set 118, the scalable transfer agent 114 may determine a specific service node 108, within a given cluster 220 of a hub network 110, that is to receive a given chunk (e.g., chunk 212). In some embodiments, the sender may select a specific cluster 220 based on a set of criteria, such as latency, location, bandwidth, CPU frequency, and/or other performance metrics.

Upon selecting a cluster 220, the endpoint device 102 may select one or more service nodes 108 (e.g., service nodes 108a, 108b, 108c, 108d, etc.) that are to receive subsets of the chunk set 118 transmitted by the sender. In some embodiments, the sender may transmit a series of chunks to the cluster 220 and a centralized control server 124 may direct the series of chunks to service nodes 108a-108d in the cluster in a round-robin rotation until each chunk 212-218 has been directed to a service node 108a-108d. In such instances, each service node 108a-108d may receive subsets of the chunk set 118, where each subset has approximately the same quantity of chunks.

Alternatively, in some embodiments, the sender may send a request to a centralized load balancer, such as a load balancer operating on the control server 124 for the cluster 220, to identify specific service nodes 108 to handle a plurality of requests. In such instances, each chunk 212 may be associated with a separate transfer request and may be handled independent of other chunks (e.g., chunks 214-218) in the chunk set 118. The load balancer may respond to one (e.g., the initial transfer request) or more (e.g., periodic responses to a set of transfer requests) by sending and receiving status information to each respective service node 108 in the cluster 220. In such instances, the load balancer may receive status information from each service node 108. In some embodiments, the load balancer may communicate with the sender by providing load balance information, such as the respective loads of each of the service nodes 108a-108d. Alternatively, the load balancer may individually respond to each of the transfer requests by identifying a specific service node 108 (e.g., the service node 108a) that is to handle a given request. In such instances, service nodes 108 with lighter loads may handle a greater subset of the chunk set 118.

In various embodiments, the scalable transfer agent 114 may initially calculate a checksum value for each chunk 212-218 before transmission. In some embodiments, the scalable transfer agent 114 may generate multiple threads that calculate checksum values for a group of chunks (e.g., four separate threads for chunks 212-218) in parallel. In various embodiments, the number of threads that compute checksum values for the chunks 212-218 in the chunk set 118 may be based on the processing and/or memory resources that are available to the scalable transfer agent 114. For example, when scalable transfer agent 114 is operating on a remote workstation instance, the remote workstation instance may request additional processing and/or memory resources from a centralized repository in order to compute checksum values for more chunks in parallel. In various embodiments, the checksum value may be added as a value in the header of messages that carry the chunk 212.

In some embodiments, the scalable transfer agent 114 may transmit the set of checksum values to the clusters 220 before transmitting the corresponding chunk. In such instances, the cluster 220 may identify a matching checksum value, indicating an identical chunk has been stored to disk (e.g., no changes were made to by the sender the specific block of data). The sender may respond by refraining from sending the chunk identified by the matching checksum value.

Upon receiving the chunks 212-218, the respective service nodes 108a-108d may calculate the checksum values for the received chunks 212-218. In various embodiments, upon receiving the first part of a given chunk 212, the receiving service node 108a may initiate the calculation of the checksum value for the received chunk 212. In some embodiments, the service node 108a may receive the checksum value for the chunk 212 as calculated by the sender and may verify the checksum value by comparing the two checksum values and determining whether there is a match. When the service node 108a determines that there is a match, the service node 108a verifies the chunk 212 and transfers the chunk 212 to storage (e.g., in a separate device or in the storage layer of the service node 108a) to be written to disk. When the service node 108a determines that the checksum values do not match, the service node 108a may transmit a response failure message (e.g., a message with a response code indicating failure) that may cause the sender to retransmit the failed chunk 212 until the service node 108a can verify the checksum value.

In some embodiments, upon calculating the checksum value for the received chunk 212, the service node 108a may transmit a response message that includes the checksum value in the response message sent to the sender as part of a lossless transport protocol (e.g., include the checksum value in the payload, include the checksum value in an extension field, etc.). For example, the distributed computing system 100 could use a lossless transport protocol, such as transmission control protocol (TCP), where a sender waits to receive acknowledgement (ACK) messages before proceeding with sending additional packets. In such instances, the acknowledgement message that the service node 108a sends may include the checksum value for the applicable chunk 212 as computed by the service node 108a. The scalable transfer agent 114 at the sender may compare the checksum values in order to verify that the cluster 220 successfully received the entire chunk 212. When the scalable transfer agent 114 determines that the checksum cannot be verified (e.g., the checksum values do not match), the scalable transfer agent 114 may identify the applicable chunk 212 for retransmission. In such instances, the scalable transfer agent 114 may transmit the chunk 212 to a different service node 108 (e.g., transmitting chunk 212 to the service node 108c during a round-robin rotation of the service nodes 108).

The service nodes 108a-108d in the cluster 220 transfer the respective chunks 212-218 to be written to disk via a storage device. In some embodiments, the storage device may be a separate device (e.g., the object storage 106) that includes a storage layer. Alternatively, the storage device may be a storage layer included in the cluster 220 (not shown). In such instances, a scalable transfer agent 114 at the recipient device (e.g., the scalable transfer agent 114d operating on the object storage 106) may calculate the checksum values for the received chunks and may transmit the calculated checksum values to the cluster 220. In such instances, the applicable device(s) in the cluster (e.g., the sending service node 108 and/or the control server 124) may identify the chunks that were not verified and may cause the applicable service node 108 to resend the failed chunk 212 until the recipient can verify the chunk 212 (e.g., by generating a checksum value that matches the checksum value generated by the service node 108).

In various embodiments, the scalable transfer agent 114 at the recipient may combine the chunks 212-218 included chunk set 118, received via the service nodes 108a-108d included in the cluster 220, to generate the combined data block. In such instances, the recipient may store the assets included in the data block by writing the applicable assets to disk. For example, the object storage 106 may store one or more asset files 116 included in the combined data block as an asset 160 (e.g., a given asset 160 may include multiple associated asset files 116). In some embodiments, the recipient may store the assets in a corresponding file system. For example, a data store in the hub network 110 (not shown) may store the asset files 116 provided by the endpoint device 102 in a file system 142 included in the data store.

In some embodiments, the scalable transfer agent 114 operating at the sender may track each asset as the asset is transferred to the recipient. For example, the scalable transfer agent 114a operating on the endpoint device 102 could generate a tracking token corresponding to each asset file 116. In some embodiments, the scalable transfer agent 114 may track one or more chunks that form the asset; in such instances, the scalable transfer agent 114 may track each of the chunks separately. Additionally or alternatively, the scalable transfer agent 114a could also maintain a tracking table and/or tracking database (e.g., a relational database management system such as SQLite, or a JavaScript application like Indexed Database [IndexedDB]) that tracks the location of each tracking token, indicating the location of the corresponding asset file 116. In such instances, the scalable transfer agent 114a may persist the asset file 116 locally until the scalable transfer agent 114a confirms that the asset file 116 has been successfully written to disk at the recipient.

Figure 3:
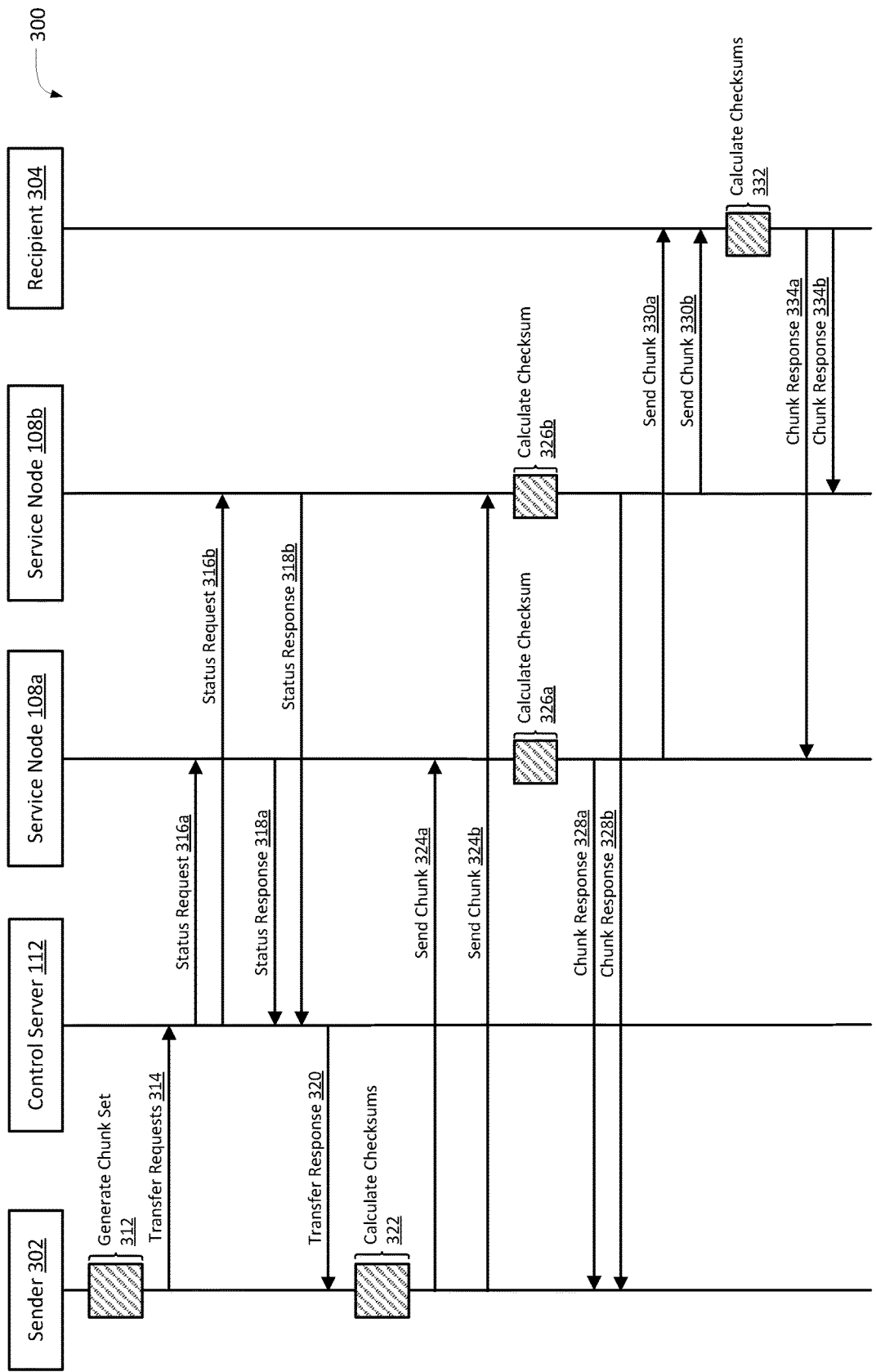
FIG. 3 illustrates an interaction diagram showing interactions between various components of the example distributed computing system of FIG. 1, according to various embodiments of the present disclosure.

FIG. 3 illustrates an interaction diagram 300 showing interactions between various components of the example distributed computing system 100 of FIG. 1, according to various embodiments of the present disclosure. One or more components of the distributed computing system 100 may perform various operation to transfer a set of asset files 116 from a sender device 302 to a recipient device 304 via a set of service nodes 108 in a given cluster 220 by performing a set of applicable actions to transfer and verify chunks corresponding to portions of the set of assets.

The example interaction diagram shows an example set of interactions associated with a user transmitting a set of asset files 116 from local storage on a sender device 302 (e.g., an endpoint device 102) to a recipient device 304 (e.g., the object storage 106) via multi-threaded processing and transmission of a set of chunks 212-218 in a chunk set 118. Other interactions between one or more components of the distributed computing system 100 are also within the scope of this disclosure.

When transmitting a set of asset files 116, the scalable transfer agent 114 at the sender (e.g., the scalable transfer agent 114a or the transfer agent plugin 122 operating on the endpoint device 102) performs various actions 312 to generate a chunk set 118. In various embodiments, the scalable transfer agent 114 may identify a set of asset files 116 that the user selected for transmission. The scalable transfer agent 114 may perform various actions 312 generate a combined data block for the set of asset files 116. For example, a user may add a group of asset files 116 (e.g., selecting a video asset for a film that includes 550,000 asset files 116 for individual image frames and associated files) to a transmission queue. In some embodiments, the transmission queue may identify the recipient device 304 for the set of asset files 116. The scalable transfer agent 114 may order and/or group the set of asset files 116 into a contiguous data block and generate a chunk set 118 by chunking the data block into a group of chunks of a pre-defined size (e.g., approximately 400 separate 256 MB-size chunks for a 100 GB data block). In some embodiments, the scalable transfer agent 114 may queue the set of asset files 116 based on a specific priority, such as prioritizing a specific type of file to the head of the queue (e.g., moving manifest files and other metadata to the head of the queue before various media files or other data files).

The scalable transfer agent 114 transmits one or more transfer request messages 314 to a control server 124 to identify one or more service nodes 108 that are to receive chunks 212-218 included in the chunk set. In various embodiments, the scalable transfer agent 114 may, for each respective chunk 212-218 in the chunk set 118, determine a specific service node 108 as an intended recipient by sending a transfer request message 314 to the control server 124. In some embodiments, the scalable transfer agent 114 may cause the sender 302 to send a single request for the chunk set 118. Alternatively, in some embodiments, the scalable transfer agent 114 may send separate transfer requests 314.

The control server 124 sends status request messages 316 (e.g., status request messages 316a, 316b) to each service node 108 (e.g., service node 108a, 108b) to determine the status of the service node 108. Each service node 108 responds with a respective status response message 318 (e.g., 318a, 318b). In various embodiments, the status response message 318 may include load information in the payload of the message. In such instances, the payload may include performance metrics for the service node (e.g., CPU core frequency, available memory, etc.) associated with the performance of the service node 108. Additionally or alternatively, the status response message 318 may include a response code in the header that indicates load information.

The control server 124 transmits to the sender 302 one or more transfer response messages 320. In some embodiments, the transfer response message 320 may list a set of available service nodes 108. In such instances, the sender 302 may transmit chunks 212-218 to the listed service nodes 108a-108b in a round-robin rotation until each chunk 212-218 has been directed to one of the listed service nodes 108a-108b. In some embodiments, a load balancer in the control server 124 may respond to the transfer request message 314. In such instances, the control server 124 may provide the load balance information, such as the respective loads of each of the service nodes 108a-108d, to the transfer response message 320. Additionally or alternatively, the control server 124 may individually respond to each of the transfer request messages 314 by identifying a specific service node 108 (e.g., the service node 108a) that is to handle a given transfer request 314.

The scalable transfer agent 114 performs various actions 322 to calculate a checksum value for each chunk 212-218 in the chunk set 118 before transmission. In some embodiments, the scalable transfer agent 114 may perform actions 312, 322 before sending the transmission request message 314 to the control server 124. In various embodiments, the scalable transfer agent 114 may calculate checksum values for multiple chunks 212-218 in parallel. For example, the scalable transfer agent 114 could generate multiple processing threads that are executed by multiple cores of a multi-core processor at the sender. Each of the multiple processing threads separately calculates a checksum value a chunk (e.g., two separate processing threads for chunks 212, 214) in parallel.

The scalable transfer agent 114 causes the sender 302 to transmit to the respective service nodes 108a, 108b one or more messages 324 (e.g., message 324a, 324b) that include the respective chunks (e.g., chunks 212, 214). In some embodiments, the scalable transfer agent 114 may transmit a series of serialized messages that include a portion of a given chunk 212 in the payload (e.g., a serialized set of messages 324a to the service node 108a to transmit a 256 MB chunk 212). In various embodiments, the scalable transfer agent 114 may use the multiple processing threads to transmit the messages 324a, 324b in parallel.

Upon receiving the one or more messages 324, the respective service nodes 108a, 108b perform various actions 326 (e.g., actions 326a, 326b) to calculate the checksum values for the received chunks 212, 214. In some embodiments, upon receiving the first part of a given chunk 212, such as the first message in a set of serialized messages, the receiving service node 108a may initiate actions 326a to calculate the checksum value for the received chunk 212.

In some embodiments, the respective service nodes 108a, 108b may receive the checksum values for the chunks 212, 214 as calculated by the sender 302. A given service node 108a may verify the checksum value by comparing the two checksum values and determining whether there is a match. When the service node 108a determines that there is a match, the service node 108a verifies the chunk 212 and transfers the chunk 212 to be written to disk. In various embodiments, each of the respective service nodes 108a, 108b may perform the actions 326a, 326b in parallel to calculate the checksum values and verify that the chunks 212, 214 were successfully received.

Upon receiving the respective chunks 212, 214, the service nodes 108 transmit response messages 328 (e.g., response message 328a, response message 328b) to the sender 302. In some embodiments, upon determining that the checksum values do not match, a service node 108a may transmit a failure message as the response message 328a (e.g., a message with a response code indicating failure). Receipt of a failure message that may cause the sender 302 to retransmit the failed chunk 212 in one or more messages 324a until the service node 108a can verify the checksum value for the chunk 212.

In some embodiments, upon performing actions 326 to calculate the checksum value for a received chunk, a given service node 108 may transmit a response message 328 that includes the checksum value. For example, the response message 328 may be a message that the service node 108 transmits to the sender 302 as part of a lossless transport protocol. In such instances, the checksum value may be added to the response message (e.g., include the checksum value in the payload, include the checksum value in an extension field, etc.). For example, the distributed computing system 100 could use TCP protocol when transmitting data, where the service node 108 transmits an ACK message as the response message 328 to the sender transmitting the message 324 that includes the portion of the chunk 212. The sender 302 may wait to receive the response message 328 before proceeding with sending further messages 324.

When the response message 328 includes the checksum value for the chunk that the service node 108a computed, the scalable transfer agent 114 at the sender 302 may compare the checksum values in order to verify that the service node 108 successfully received the entire chunk. When the scalable transfer agent 114 determines that the checksum cannot be verified (e.g., the checksum values do not match), the scalable transfer agent 114 may identify the applicable chunk for retransmission (e.g., retransmit message 324 to one of the service nodes 108).

The service nodes 108a-108d in the cluster 220 transmit messages 330 (e.g., messages 330a, 330b) to transfer the respective chunks 212, 214 to the recipient device 304 to be written to disk. In some embodiments, the recipient device 304 may be a separate device (e.g., the object storage 106) that includes one or more storage partitions in a storage layer. Alternatively, the recipient device 304 may be a storage layer included in the cluster 220 with the service nodes 108 (not shown).

A scalable transfer agent 114 at the recipient device 304 (e.g., the scalable transfer agent 114d operating on the object storage 106) performs various actions 332 to calculate the checksum values for the received chunks 212, 214. In some embodiments, the recipient device 304 may transmit one or more response messages 334 (e.g., response message 334a, 334b) that include the calculated checksum values. In such instances, the respective service nodes 108a, 108b may verify the checksum values. Otherwise, the respective service nodes 108a, 108b may identify the checksum values that were not verified and may resend the chunks 212, 214 to the recipient device 304 via messages 330 until the service node 108a, 108b can successfully verify the checksum value for the chunk 212, 214.

Figure 4:
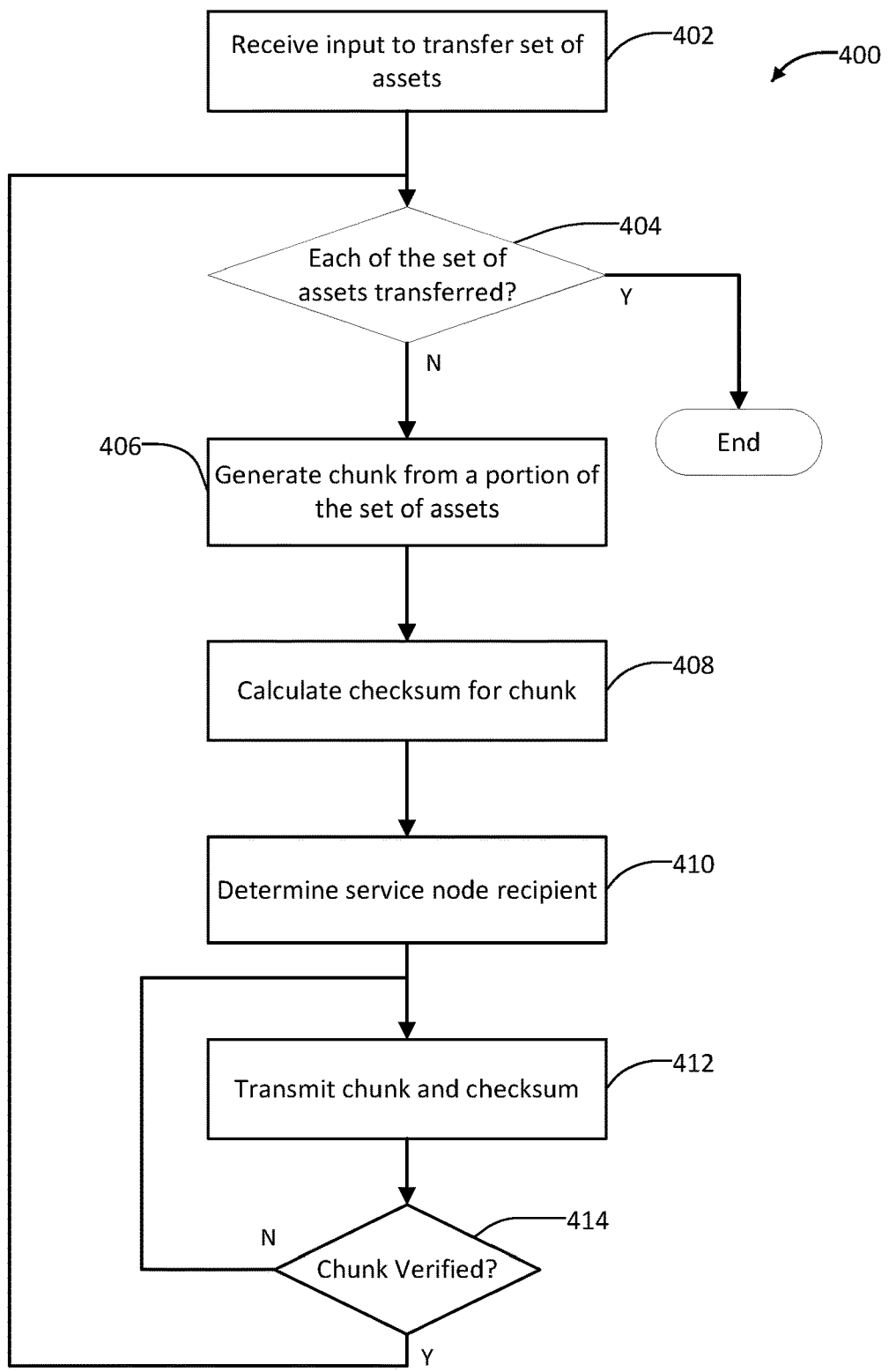
FIG. 4 sets forth a flow diagram of method steps for handling a transfer of a set of files from a sender to a recipient included in the distributed computing system of FIG. 1, according to various embodiments of the present disclosure.

FIG. 4 sets forth a flow diagram of method steps for handling a transfer of a set of files from a sender to a recipient included in the distributed computing system 100 of FIG. 1, according to various embodiments of the present disclosure. Although the method steps are described with reference to the systems and call flows of FIGS. 1-3, persons skilled in the art will understand that any system configured to implement the method steps, in any order, falls within the scope of the present disclosure.

Method 400 begins at step 402, where a scalable transfer agent 114 receives a user input to transfer a set of assets. In various embodiments, a scalable transfer agent 114 at a sender device 302 (e.g., the scalable transfer agent 114 or the transfer agent plugin 122) may receive an input indicating that a set of assets, such as a selected group of asset files 116, is to be transferred to a recipient device 304. In some embodiments, the set of asset files 116 may correspond to a set of data and associated metadata, such as a series of frames (e.g., 3,600 individual frames for a 1-minute video clip) and related data and metadata.

At step 404, the scalable transfer agent 114 determines whether each asset in the set of assets has been successfully transmitted to the recipient device 304. In various embodiments, the scalable transfer agent 114 may track each asset file in the set of asset files 116 in order to verify whether the recipient successfully received each asset file 116. In some embodiments, the scalable transfer agent 114 may persist each asset file 116 and persist each asset file 116 at the sender device 302 in order to enable the sender 302 to pause and resume the transfer of particular asset files 116 over multiple sessions. In such instances, the scalable transfer agent 114 may determine which assets files 116 have not been successfully received by the recipient 304 and may resume the transfer of the set of assets by retransmitting the asset files 116. When the scalable transfer agent 114 determines that the entire set of asset files 116 was successfully received by the recipient 304, the scalable transfer agent 114 determines that the process has been completed and ends method 400; otherwise, the scalable transfer agent proceeds to step 406.

At step 406, the scalable transfer agent 114 generates a chunk from a portion of the set of assets. In various embodiments, the scalable transfer agent 114 may generate a chunk set 118 by initially generating a combined data block from the set of asset files 116. For example, a user may provide an input that selects a group of asset files to a transmission queue at the sender device 302. The scalable transfer agent 114 may order and/or group the set of asset files 116 into a contiguous data block and generate a chunk set 118 by chunking the data block into a group of chunks of a pre-defined size (e.g., generating multiple 128 MB-size chunks for the data block). In some embodiments, the scalable transfer agent 114 may queue the set of asset files 116 based on a specific priority, such as prioritizing a specific type of file to the head of the queue (e.g., moving manifest files and other metadata to the head of the queue before various media files or other data files).

At step 408, the scalable transfer agent 114 calculates a checksum value for a given chunk 212 in the chunk set 118. In some embodiments, the scalable transfer agent 114 may perform various techniques to calculate a checksum value based on the data included in the given chunk 212. In various embodiments, the scalable transfer agent 114 may calculate checksum values for multiple chunks 212-218 in parallel. For example, the scalable transfer agent 114 could, via multiple processing threads, perform step 408 for a plurality of chunks 212-218 in parallel. In such instances, each of the multiple processing threads may calculate a checksum value for its respective chunk 212-218.

At step 410, the scalable transfer agent 114 determines the service node that is to receive the respective chunk. In various embodiments, the scalable transfer agent 114 determines, for each of the chunks 212-218, a specific service node 108 that is to receive a given chunk. In some embodiments, the sender device 302. In some embodiments, the sender may send a request to a control server 124, such as a load balancer operating on the control server 124, to identify specific service nodes 108 that are to handle a plurality of chunks 212-218. In such instances, each of the chunks 212-218 may be associated with a separate transfer request and may be handled independent of other chunks in the chunk set 118. The load balancer may respond to a request made by the sender device 302 with load balance information, such as the respective loads of each of the service nodes 108a-108d. Alternatively, the control server 124 may identify a specific service node 108 (e.g., the service node 108a) that is to handle a given chunk 212.

At step 412, the scalable transfer agent 114 causes the sender device 302, to transmit to the service node 108 identified as the recipient, one or more messages 324 that include portions of the given chunks 212. In some embodiments, the scalable transfer agent 114 may transmit a series of serialized messages 324 that include a portion of a given chunk 212 in the payload (e.g., a serialized set of messages 324a to the service node 108a to transmit a 256 MB chunk 212). In various embodiments, the scalable transfer agent 114 may use the multiple processing threads to transmit the messages 324 (e.g., messages 324a, 324b, etc.) for multiple chunks 212-218 in parallel to separate service nodes 108a-108d.

In some embodiments, the scalable transfer agent 114 may transmit the one or more messages 324 concurrently with other steps, such as the computation of the checksum that is performed in step 408. In such instances, the scalable transfer agent 114 may determine the recipient and transmit a given chunk 212 through one or more messages 324 while computing the checksum for the given chunk 212.

At step 414, the scalable transfer agent 114 determines whether the checksum value for the given chunk is verified. In various embodiments, upon receiving the one or more messages 324, the service nodes 108 may calculate the checksum value for the given chunk 212 included in message 324. In some embodiments, upon receiving the first part of a given chunk 212, such as the first message in a set of serialized messages, the receiving service node 108 may initiate the calculation of the checksum value for the given chunk 212.

In some embodiments, the service nodes 108 may receive the checksum value calculated by the sender 302 for the given chunks 212. The service node 108 may verify the checksum value by comparing the two checksum values and determining whether there is a match. When the service node 108 determines that there is a match, the service node 108 verifies the chunk 212 and transmits an acknowledgment message to the sender device 302; the service node 108 also transfers the chunk 212 to be written to disk. In some embodiments, upon determining that the checksum values do not match, a service node 108a may transmit a failure message as the response message 328a (e.g., a message with a response code indicating failure). When the sender device 302 receives an acknowledgment message, the scalable transfer agent 114 determines that the chunk has been verified and proceeds to step 404 to transmit additional chunks in the chunk set 118. When the sender device 302 receives a failure message, the scalable transfer agent 114 determines that the chunk has not been verified and returns to step 412 to retransmit the failed chunk 212 in one or more messages 324 until the checksum value for the chunk 212 can be verified.

Alternatively, in some embodiments, the service node 108 may transmit a response message 328 that includes the calculated checksum value. For example, the response message 328 may be a message that includes the calculated checksum value. When the response message 328 includes the checksum value for the chunk that the service node 108a computed, the scalable transfer agent 114 at the sender 302 may compare the checksum values in order to verify that the service node 108 successfully received the entire chunk. When the scalable transfer agent 114 determines that the chunk has been verified, the scalable transfer agent 114 proceeds to step 404 to transmit additional chunks in the chunk set 118. When the scalable transfer agent 114 determines that the chunk has not been verified, the scalable transfer agent 114 and returns to step 412 to retransmit the failed chunk 212 in one or more messages 324 until the checksum value for the chunk 212 can be verified.

Content Delivery System Overview

Figure 5:
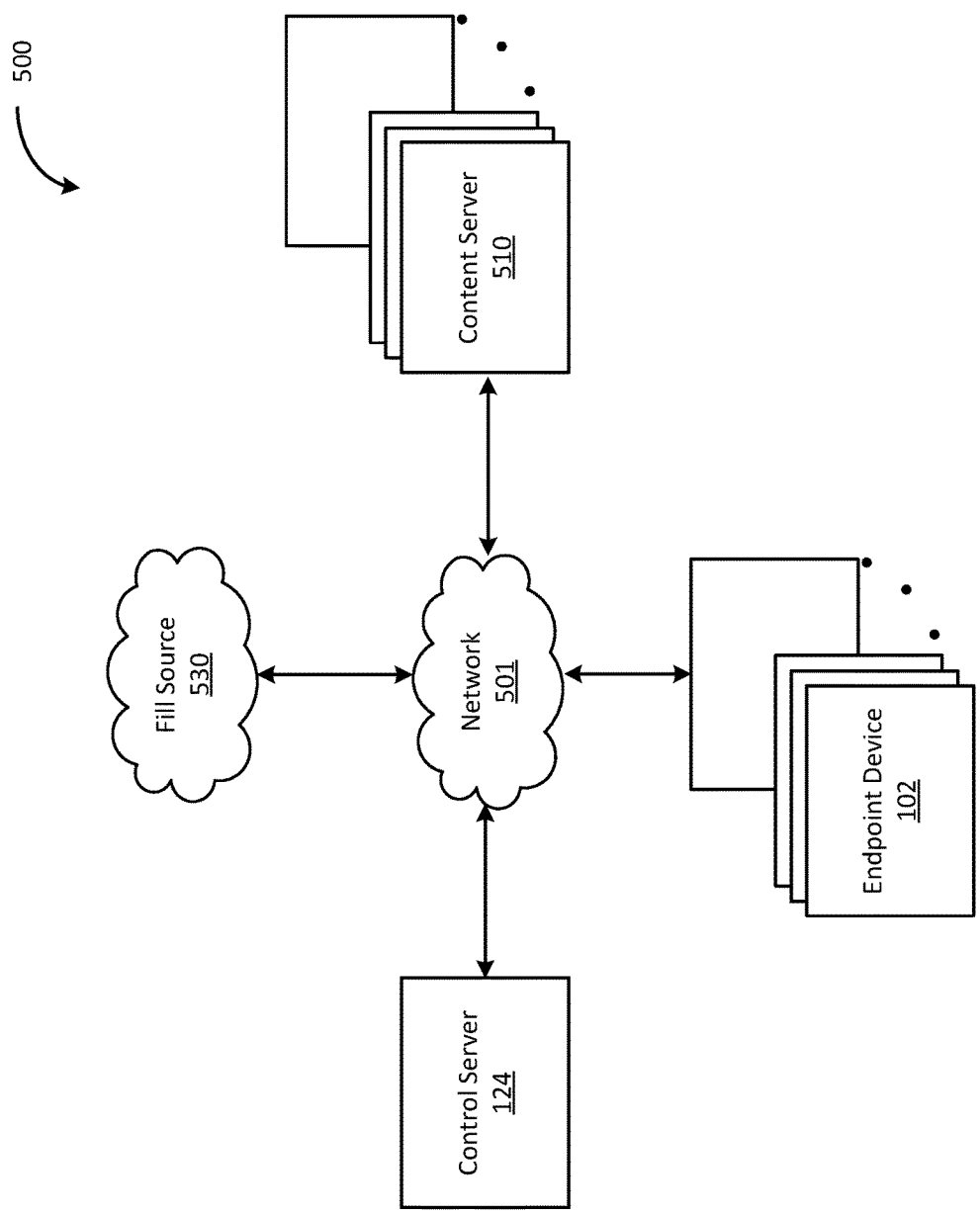
FIG. 5 illustrates another example network infrastructure that is configured to implement one or more aspects of the present disclosure.

FIG. 5 illustrates another example network infrastructure that is configured to implement one or more aspects of the present disclosure. As shown, the network infrastructure 500 includes one or more content servers 510, a control server 124, and one or more endpoint devices 102, which are connected to one another and/or one or more cloud services 530 via the communications network 501. The network infrastructure 500 is generally used to distribute content to the content servers 510 and the endpoint devices 102.

Each endpoint device 102 communicates with one or more content servers 510 (also referred to as "caches" or "nodes") via the network 501 to download content, such as textual data, graphical data, audio data, video data, and other types of data. The downloadable content, also referred to herein as a "file," is then presented to a user of one or more endpoint devices 102. In various embodiments, the endpoint devices 102 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Network 501 includes any technically feasible wired, optical, wireless, or hybrid network that transmits data between or among the content servers 510, the control server 124, the endpoint device 102, the cloud services 530, and/or other components. For example, the network 501 could include a wide area network (WAN), local area network (LAN), personal area network (PAN), WiFi network, cellular network, Ethernet network, Bluetooth network, universal serial bus (USB) network, satellite network, and/or the Internet.

Each content server 510 may include one or more applications configured to communicate with the control server 124 to determine the location and availability of various files that are tracked and managed by the control server 124. Each content server 510 may further communicate with the cloud services 530 and one or more other content servers 510 to "fill" each content server 510 with copies of various files. In addition, the content servers 510 may respond to requests for files received from endpoint devices 102. The files may then be distributed from the content server 510 or via a broader content distribution network. In some embodiments, the content servers 510 may require users to authenticate (e.g., using a username and password) before accessing files stored on the content servers 510. Although only a single control server 124 is shown in FIG. 6, in various embodiments multiple control servers 124 may be implemented to track and manage files.

In various embodiments, the cloud services 530 may include an online storage service (e.g., Amazon® Simple Storage Service, Google® Cloud Storage, etc.) in which a catalog of files, including thousands or millions of files, is stored and accessed in order to fill the content servers 510. The cloud services 530 also may provide compute or other processing services. Although only a single instance of cloud services 530 is shown in FIG. 6, in various embodiments multiple cloud services 530 and/or cloud service instances may be implemented.

Figure 6:
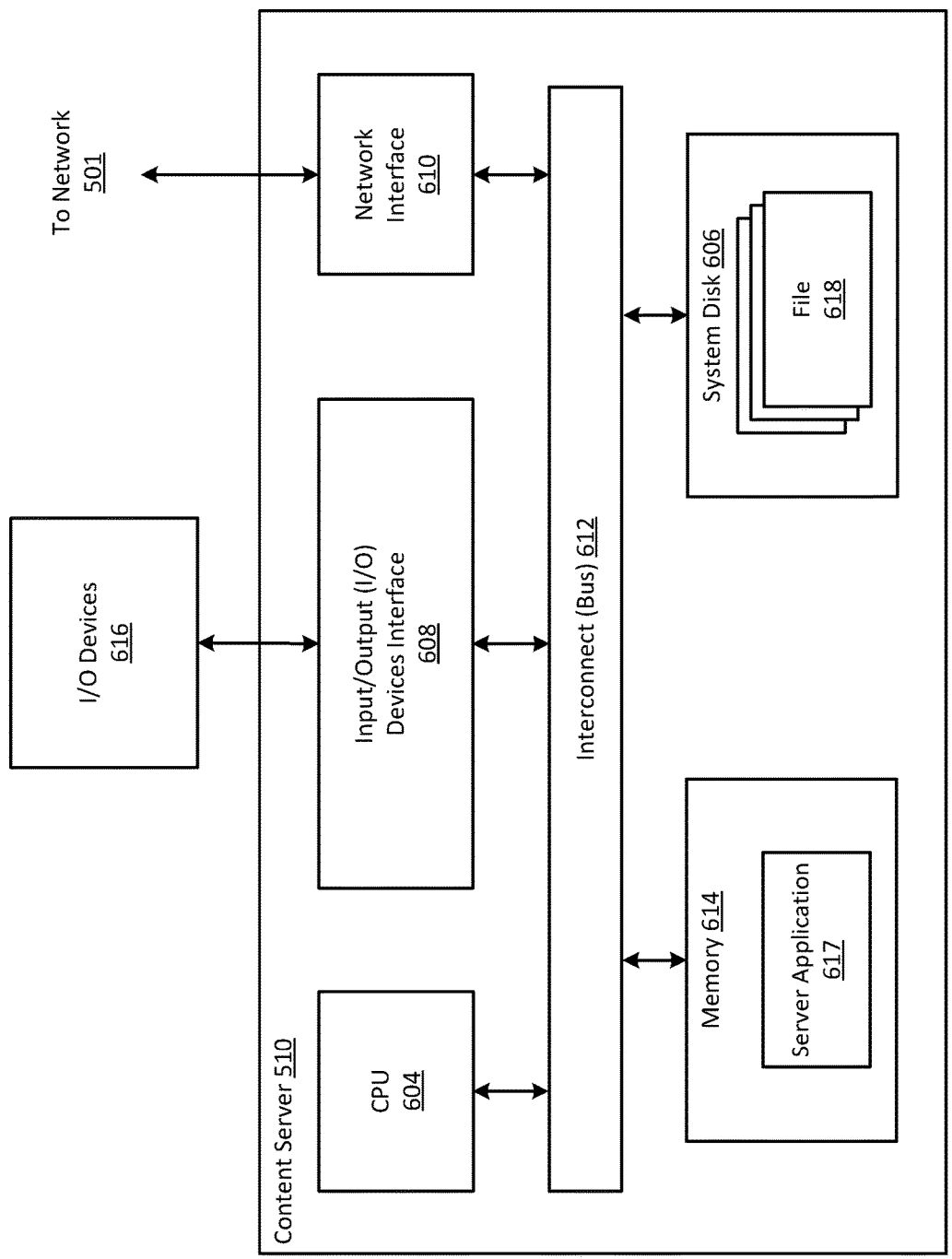
FIG. 6 is a more detailed illustration of the content server of FIG. 5, according to various embodiments of the present disclosure.

FIG. 6 is a more detailed illustration of the content server 510 of FIG. 5, according to various embodiments of the present disclosure. As shown, the content server 510 includes, without limitation, a central processing unit (CPU) 604, a system disk 606, an input/output (I/O) devices interface 608, a network interface 610, an interconnect 612, and a system memory 614.

The CPU 604 is configured to retrieve and execute programming instructions, such as a server application 617, stored in the system memory 614. Similarly, the CPU 604 is configured to store application data (e.g., software libraries) and retrieve application data from the system memory 614. The interconnect 612 is configured to facilitate transmission of data, such as programming instructions and application data, between the CPU 604, the system disk 606, the I/O devices interface 608, the network interface 610, and the system memory 614. The I/O devices interface 608 is configured to receive input data from the I/O devices 616 and transmit the input data to the CPU 604 via the interconnect 612. For example, the I/O devices 616 may include one or more buttons, a keyboard, a mouse, and/or other input devices. The I/O devices interface 608 is further configured to receive output data from the CPU 604 via the interconnect 612 and transmit the output data to the I/O devices 616.

The system disk 606 may include one or more hard disk drives, solid state storage devices, or similar storage devices. The system disk 606 is configured to store non-volatile data such as files 618 (e.g., audio files, video files, subtitle files, application files, software libraries, etc.). The files 618 can then be retrieved by the one or more endpoint devices 102 via the network 501. In some embodiments, the network interface 610 is configured to operate in compliance with the Ethernet standard.

The system memory 614 includes the server application 617, which is configured to service requests received from the endpoint device 102 and other content servers 510 for the one or more files 618. When the server application 617 receives a request for a given file 618, the server application 617 retrieves the requested file 618 from the system disk 606 and transmits the file 618 to an endpoint device 102 or a content server 510 via the network 501. The files 618 include digital content items such as video files, audio files, and/or still images. In addition, the files 618 may include metadata associated with such content items, user/subscriber data, etc. The files 618 that include visual content item metadata and/or user/subscriber data may be employed to facilitate the overall functionality of network infrastructure 500. In alternative embodiments, some, or all of the files 618 may instead be stored in a control server 124, or in any other technically feasible location within the network infrastructure 500.

Figure 7:
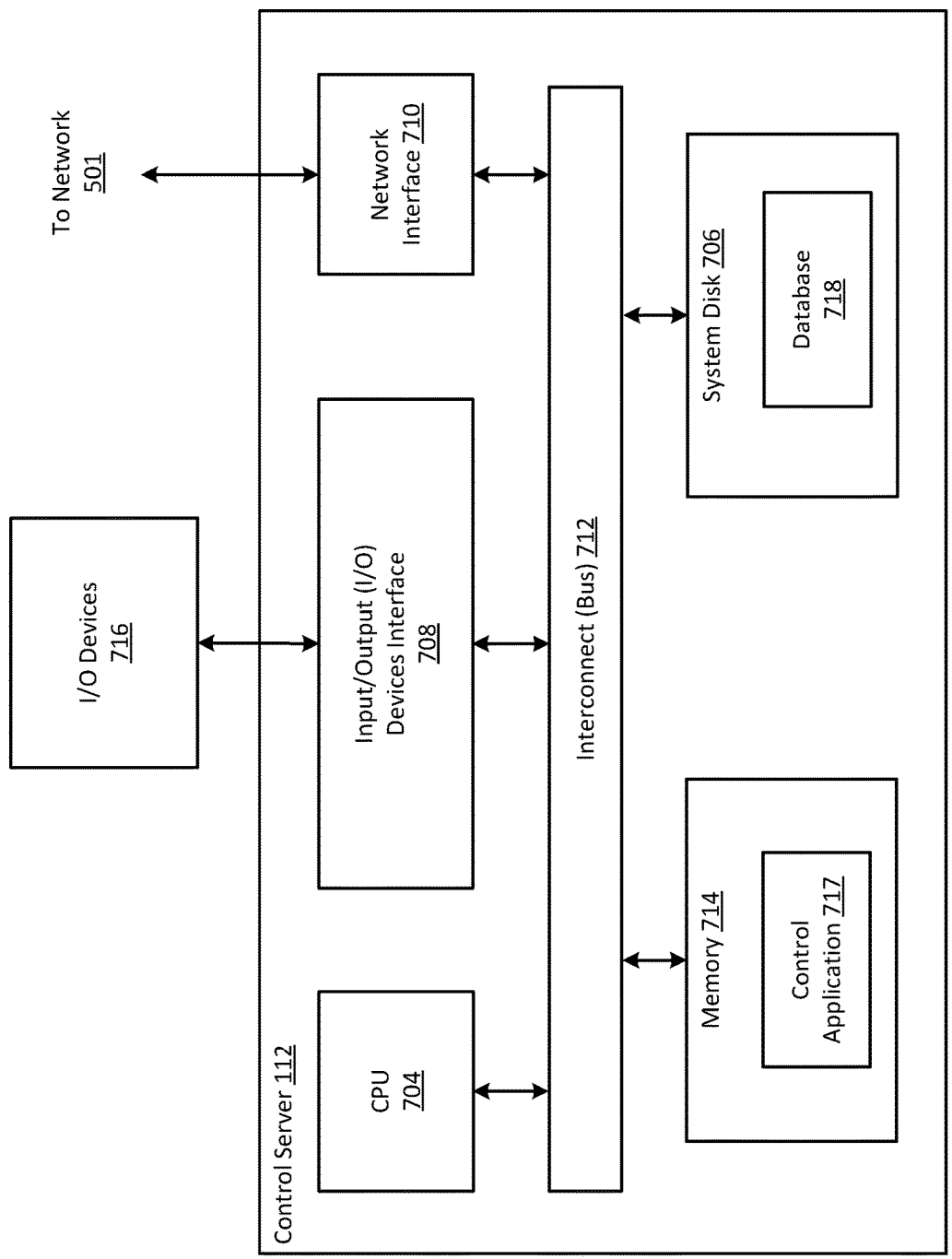
FIG. 7 is a more detailed illustration of the control server of FIG. 5, according to various embodiments of the present disclosure.

FIG. 7 is a more detailed illustration of the control server 124 of FIG. 5, according to various embodiments of the present disclosure. As shown, the control server 124 includes, without limitation, a central processing unit (CPU) 704, a system disk 706, an input/output (I/O) devices interface 708, a network interface 710, an interconnect 712, and a system memory 714.

The CPU 704 is configured to retrieve and execute programming instructions, such as the control application 717, stored in the system memory 714. Similarly, the CPU 704 is configured to store application data (e.g., software libraries) and retrieve application data from the system memory 714 and a database 718 stored in the system disk 706. Interconnect 712 is configured to facilitate transmission of data between the CPU 704, the system disk 706, the I/O devices interface 708, the network interface 710, and the system memory 714. The I/O devices interface 708 is configured to transmit input data and output data between the I/O devices 716 and the CPU 704 via interconnect 712. The system disk 706 may include one or more hard disk drives, solid state storage devices, and the like. The system disk 706 is configured to store a database 718 of information associated with content servers 510, cloud services 530, and files 618.

The system memory 714 includes a control application 717 configured to access information stored in the database 718 and process the information to determine the manner in which specific files 618 will be replicated across the content servers 510 included in the network infrastructure 500. The control application 717 may further be configured to receive and analyze performance characteristics associated with one or more of the content servers 510 and/or the endpoint devices 102. As noted above, in some embodiments, metadata associated with such visual content items, and/or user/subscriber data may be stored in database 718 rather than in files 618 stored in content servers 510.

Figure 8:
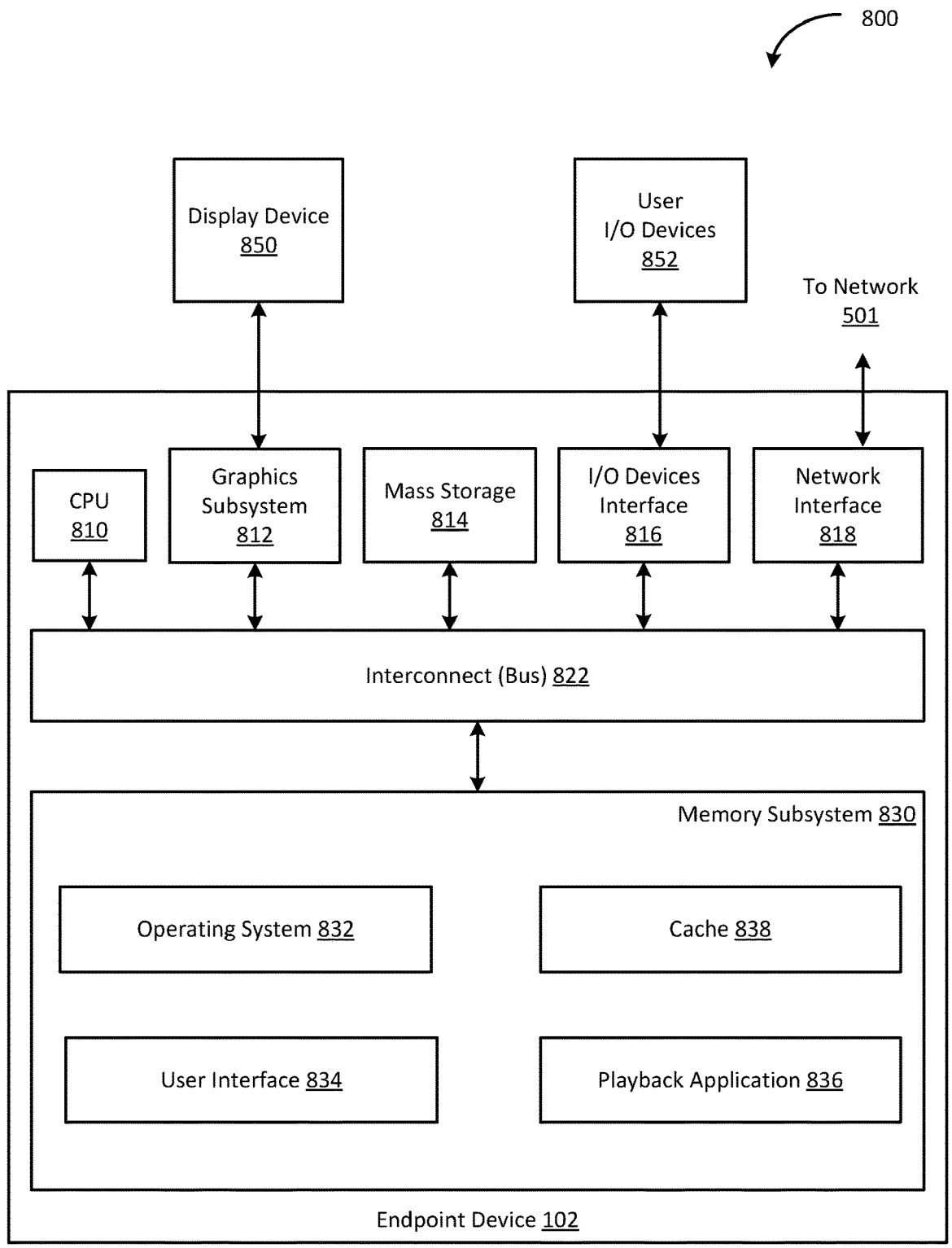
FIG. 8 is a more detailed illustration of the endpoint device of FIG. 5, according to various embodiments of the present disclosure.

FIG. 8 is a more detailed illustration of the endpoint device 102 of FIG. 5, according to various embodiments of the present disclosure. As shown, the endpoint device 102 may include, without limitation, a CPU 810, a graphics subsystem 812, an I/O devices interface 814, a mass storage unit 816, a network interface 818, an interconnect 822, and a memory subsystem 830.

In some embodiments, the CPU 810 is configured to retrieve and execute programming instructions stored in the memory subsystem 830. Similarly, the CPU 810 is configured to store and retrieve application data (e.g., software libraries) residing in the memory subsystem 830. The Interconnect 822 is configured to facilitate transmission of data, such as programming instructions and application data, between the CPU 810, the graphics subsystem 812, the I/O devices interface 814, the mass storage unit 816, the network interface 818, and the memory subsystem 830.

In some embodiments, the graphics subsystem 812 is configured to generate frames of video data and transmit the frames of video data to the display device 850. In some embodiments, the graphics subsystem 812 may be integrated into an integrated circuit, along with CPU 810. The display device 850 may comprise any technically feasible means for generating an image for display. For example, the display device 850 may be fabricated using liquid crystal display (LCD) technology, cathode-ray technology, and light-emitting diode (LED) display technology. The I/O devices interface 814 is configured to receive input data from the user I/O devices 852 and transmit the input data to the CPU 810 via the interconnect 822. For example, the user I/O devices 852 may include one or more buttons, a keyboard, and/or a mouse or other pointing device. The I/O devices interface 814 also includes an audio output unit configured to generate an electrical audio output signal. The user I/O devices 852 includes a speaker configured to generate an acoustic output in response to the electrical audio output signal. In alternative embodiments, the display device 850 may include the speaker. Examples of suitable devices known in the art that can display video frames and generate an acoustic output include televisions, smartphones, smartwatches, electronic tablets, and the like.

A mass storage unit 816, such as a hard disk drive or flash memory storage drive, is configured to store non-volatile data. The network interface 818 is configured to transmit and receive packets of data via the network 501. In some embodiments, the network interface 818 is configured to communicate using the well-known Ethernet standard. The network interface 818 is coupled to the CPU 810 via the interconnect 822.

In some embodiments, the memory subsystem 830 includes programming instructions and application data that include an operating system 832, a user interface 834, a playback application 836, and a platform player 838. The operating system 832 performs system management functions such as managing hardware devices including the network interface 818, the mass storage unit 816, the I/O devices interface 814, and the graphics subsystem 812. The operating system 832 also provides process and memory management models for the user interface 834, the playback application 836, and/or the platform player 838. The user interface 834, such as a window and object metaphor, provides a mechanism for user interaction with the endpoint device 102. Persons skilled in the art will recognize the various operating systems and user interfaces that are well-known in the art and suitable for incorporation into the endpoint device 102.

In some embodiments, playback application 836 is configured to request and receive content from content server 510 via network interface 818. Further, playback application 836 is configured to interpret the content and present the content via display device 850 and/or user I/O devices 852. In so doing, playback application 836 may generate frames of video data based on the received content and then transmit those frames of video data to platform player 838. In response, platform player 838 causes display device 850 to output the frames of video data for playback of the content on endpoint device 102. In one embodiment, platform player 838 is included in operating system 832.

In sum, a scalable transfer agent enables two points of a distributed computing system to transfer large volumes of data reliably and at great speeds. The scalable transfer agent may be a plugin to a browser operating on an endpoint device, or an application running on an endpoint device or the storage layer of a storage device (e.g., a cache device or object storage).

When transmitting data from a sender to a recipient, a scalable transfer agent at the sender determines a set of files that are to be transferred to the recipient. The scalable transfer agent groups the files into a data block and separates the data block into a set of chunks. In some embodiments, the data block is a portion of a single file. Alternatively, the data block may include two or more files. For each chunk, the scalable transfer agent generates a checksum value. The scalable transfer agent identifies a service node that is to receive the chunk and queues the chunk for transmission. The scalable transfer agent transmits the chunk and provides the checksum value. In some embodiments, the service node verifies the checksum value and fails any chunk where the checksum verification failed, causing the scalable transfer agent to retransmit the failed chunk. In some embodiments, the scalable transfer agent may cause the sender to transmit multiple chunks in parallel to a set of service nodes.

Upon verifying the receipt of the set of chunks, the set of service nodes send respective subsets of chunks to a recipient. In such instances, each service node in the set of services nodes receives a distinct subset of chunks that combine to form the data block. Each of the service nodes transmits the respective subsets of chunks in parallel to a recipient, as well as checksum values for each of the respective chunks. The recipient verifies each of the checksum values and fails any chunk where the checksum verification failed, causing the service to retransmit the failed chunk. Upon receiving the data block, the recipient may store the files included in the data block as files.

At least one technological advantage of the disclosed techniques relative to the prior art is that the scalable transfer agent enables devices within a distributed computing network to transfer large volumes of data with great speed and reliability. In particular, the scalable transfer agent generating a set of separate chunks and handling each chunk as a separate file enables the distributed computing system to parallelize transferring the set of chunks to one or more destination nodes associated with a recipient. Further, the scalable transfer agent generating checksum values for each chunk enables recipient devices to verify that a given chunk is complete and not-corrupt, enabling devices in the distributed computing system to maintain high data integrity while limiting the amount of data that the sender needs to resend when a checksum value cannot be successfully verified. These technical advantages provide one or more technological advancements over prior art approaches.

1. In various embodiments, a computer-implemented method comprises determining a set of digital assets to transfer to a destination device, generating, from the set of digital assets, a corresponding set of chunks, where each chunk is a pre-defined size, for each chunk in the set of chunks, transmitting the chunk to a service node included in a set of service nodes, and verifying that the service node received the chunk, where the set of service nodes receives at least two chunks of the set of chunks in parallel, and after the set of service nodes send the at least two chunks in parallel to the destination device, verifying that the destination device received the set of chunks.

2. The computer-implemented method of clause 1, where verifying that the service node received the chunk comprises calculating a first checksum value for the chunk, determining that the first checksum value does not match a second checksum value that the service node calculates for the chunk, and retransmitting the chunk to the service node, where a third checksum value that the service node calculates for the chunk received from the retransmission matches the first checksum value.

3. The computer-implemented method of clause 1 or 2, where verifying that the destination device received the set of chunks comprises calculating, for each chunk in the set of chunks, a checksum value, determining whether each calculated checksum value matches a corresponding checksum value calculated by the destination device, identifying a chunk corresponding to each non-matching checksum value, and causing the destination device to receive a retransmission of each identified chunk.

4. The computer-implemented method of any of clauses 1-3, further comprising, for each digital asset in the set of digital assets, persisting the digital asset in local storage, and upon determining that the destination device has written a copy of the digital asset to storage at the destination device, removing the digital asset from local storage.

5. The computer-implemented method of any of clauses 1-4, where generating the set of chunks comprises generating a data block from the set of digital assets, determining, based on the pre-defined size, a block size corresponding to the chunk, and chunking the data block into the set of chunks.

6. The computer-implemented method of any of clauses 1-5, where the set of assets include a plurality of individual frames of a video, and a manifest file for the plurality of individual frames.

7. The computer-implemented method of any of clauses 1-6, where the set of assets comprises a single file that is larger than 10 GB.

8. The computer-implemented method of any of clauses 1-7, where a first subset of chunks from the set of chunks are transmitted to different service nodes in the set of service nodes using multiple processing threads.

9. The computer-implemented method of any of clauses 1-8, further comprising pausing transfer of the set of chunks to the destination device, where a first subset of chunks has been received by the destination device and a second subset of chunks that have not been transmitted to the destination device persist in local storage, and resuming transfer of the set of chunks by transmitting the second subset of chunks to the destination device without transmitting at least a portion of the first subset of chunks to the destination device.

10. The computer-implemented method of any of clauses 1-9, where the set of service nodes are included in a cluster, and the service node in the set of service nodes is selected to receive the chunk based on the relative loads of the service nodes in the set of service nodes.

11. In various embodiments, one or more non-transitory computer-readable storage media storing instructions that, when executed by one or more processors, cause the one or more processors to perform the steps of determining a set of digital assets to transfer to a destination device, generating, from the set of digital assets, a corresponding set of chunks, where each chunk is a pre-defined size, for each chunk in the set of chunks, transmitting the chunk to a service node included in a set of service nodes, and verifying that the service node received the chunk, where the set of service nodes receives at least two chunks of the set of chunks in parallel, and after the set of service nodes send the at least two chunks in parallel to the destination device, verifying that the destination device received the set of chunks.

12. The one or more non-transitory computer-readable storage media of clause 11, where verifying that the service node received the chunk comprises calculating a first checksum value for the chunk, determining that the first checksum value does not match a second checksum value that the service node calculates for the chunk, and retransmitting the chunk to the service node, where a third checksum value that the service node calculates for the chunk received from the retransmission matches the first checksum value.

13. The one or more non-transitory computer-readable storage media of clause 11 or 12, where verifying that the destination device received the set of chunks comprises calculating, for each chunk in the set of chunks, a checksum value, determining whether each calculated checksum value matches a corresponding checksum value calculated by the destination device, identifying a chunk corresponding to each non-matching checksum value, and causing the destination device to receive a retransmission of each identified chunk.

14. The one or more non-transitory computer-readable storage media of any of clauses 11-13, where a first subset of chunks from the set of chunks are transmitted to different service nodes in the set of service nodes using multiple processing threads.

15. The one or more non-transitory computer-readable storage media of any of clauses 11-14, where a transfer agent plugin operating in a browser on one of a sender device or the destination device receives an indication of the set of digital assets.

16. The one or more non-transitory computer-readable storage media of any of clauses 11-15, where a transfer agent application operating separately from a browser on one of a sender device or the destination device receives an indication of the set of digital assets.

17. The one or more non-transitory computer-readable storage media of any of clauses 11-16, where the chunk is transmitted to the service node using transmission control protocol (TCP).

18. In various embodiments, a system comprises a memory storing a scalable transfer agent application, and a processor coupled to the memory that executes the scalable transfer agent application by performing the steps of determining a set of digital assets to transfer to a destination device, generating, from the set of digital assets, a corresponding set of chunks, where each chunk is a pre-defined size, for each chunk in the set of chunks, transmitting the chunk to a service node included in a set of service nodes, and verifying that the service node received the chunk, where the set of service nodes receives at least two chunks of the set of chunks in parallel, and after the set of service nodes send the at least two chunks in parallel to the destination device, verifying that the destination device received the set of chunks.

19. The system of clause 18, where verifying that the service node received the chunk comprises calculating a first checksum value for the chunk, determining that the first checksum value does not match a second checksum value that the service node calculates for the chunk, and retransmitting the chunk to the service node, where a third checksum value that the service node calculates for the chunk received from the retransmission matches the first checksum value.

20. The system of clause 18 or 19, where verifying that the destination device received the set of chunks comprises calculating, for each chunk in the set of chunks, a checksum value, determining whether each calculated checksum value matches a corresponding checksum value calculated by the destination device, identifying a chunk corresponding to each non-matching checksum value, and causing the destination device to receive a retransmission of each identified chunk.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
   determining a set of digital assets to transfer to a destination device;
   generating, from the set of digital assets, a corresponding set of chunks, wherein each chunk is a pre-defined size;
   for each chunk in the set of chunks:
   calculating a checksum value for the chunk;
   transmitting the chunk to a service node included in a set of service nodes,
   transmitting a message that includes the checksum value to the service node, and
   verifying that the service node received the chunk,
   wherein the set of service nodes receives at least two chunks of the set of chunks in parallel; and
   after the set of service nodes sends the at least two chunks in parallel to the destination device, verifying, based on the checksum values for each chunk in the set of chunks, that the destination device received the set of chunks.

2. The computer-implemented method of claim 1, wherein verifying that the service node received the chunk comprises:
   determining that the first checksum value for the chunk does not match a second checksum value that the service node calculates for the chunk; and
   retransmitting the chunk to the service node,
   wherein a third checksum value that the service node calculates for the chunk received from the retransmission matches the first checksum value for the chunk.

3. The computer-implemented method of claim 1, wherein verifying that the destination device received the set of chunks comprises:
   calculating, for each chunk in the set of chunks, a checksum value;
   determining whether each calculated checksum value matches a corresponding checksum value calculated by the destination device;
   identifying a chunk corresponding to each non-matching checksum value; and
   causing the destination device to receive a retransmission of each identified chunk.

4. The computer-implemented method of claim 1, further comprising, for each digital asset in the set of digital assets:
   persisting the digital asset in local storage; and
   upon determining that the destination device has written a copy of the digital asset to storage at the destination device, removing the digital asset from local storage.

5. The computer-implemented method of claim 1, wherein generating the set of chunks comprises:
   grouping the set of digital assets to generate a single data block;
   determining, based on the pre-defined size, a block size corresponding to the chunk; and
   chunking the single data block into the set of chunks.

6. The computer-implemented method of claim 1, wherein the set of assets include:
   a plurality of individual frames of a video, and
   a manifest file for the plurality of individual frames.

7. The computer-implemented method of claim 1, wherein the set of assets comprises a single file that is larger than 10 GB.

8. The computer-implemented method of claim 1, wherein a first subset of chunks from the set of chunks are transmitted to different service nodes in the set of service nodes using multiple processing threads.

9. The computer-implemented method of claim 1, further comprising:
   pausing transfer of the set of chunks to the destination device, wherein a first subset of chunks has been received by the destination device and a second subset of chunks that have not been transmitted to the destination device persist in local storage; and
   resuming transfer of the set of chunks by transmitting the second subset of chunks to the destination device without transmitting at least a portion of the first subset of chunks to the destination device.

10. The computer-implemented method of claim 1, wherein:
   the set of service nodes are included in a cluster; and
   the service node in the set of service nodes is selected to receive the chunk based on relative loads of the service nodes in the set of service nodes.

11. One or more non-transitory computer-readable storage media storing instructions that, when executed by one or more processors, cause the one or more processors to perform the steps of:
   determining a set of digital assets to transfer to a destination device;
   generating, from the set of digital assets, a corresponding set of chunks, wherein each chunk is a pre-defined size;
   for each chunk in the set of chunks:
      calculating a checksum value for the chunk;
      transmitting the chunk to a service node included in a set of service nodes,
      transmitting a message that includes the checksum value to the service node; and
      verifying that the service node received the chunk, wherein the set of service nodes receives at least two chunks of the set of chunks in parallel; and
   after the set of service nodes send the at least two chunks in parallel to the destination device, verifying, based on the checksum values for each chunk in the set of chunks, that the destination device received the set of chunks.

12. The one or more non-transitory computer-readable storage media of claim 11, wherein verifying that the service node received the chunk comprises:
   determining that the first checksum value for the chunk does not match a second checksum value that the service node calculates for the chunk; and
   retransmitting the chunk to the service node,
   wherein a third checksum value that the service node calculates for the chunk received from the retransmission matches the first checksum value for the chunk.

13. The one or more non-transitory computer-readable storage media of claim 11, wherein verifying that the destination device received the set of chunks comprises:
   calculating, for each chunk in the set of chunks, a checksum value;
   determining whether each calculated checksum value matches a corresponding checksum value calculated by the destination device;
   identifying a chunk corresponding to each non-matching checksum value; and
   causing the destination device to receive a retransmission of each identified chunk.

14. The one or more non-transitory computer-readable storage media of claim 11, wherein a first subset of chunks from the set of chunks are transmitted to different service nodes in the set of service nodes using multiple processing threads.

15. The one or more non-transitory computer-readable storage media of claim 11, wherein a transfer agent plugin operating in a browser on one of a sender device or the destination device receives an indication of the set of digital assets.

16. The one or more non-transitory computer-readable storage media of claim 11, wherein a transfer agent application operating separately from a browser on one of a sender device or the destination device receives an indication of the set of digital assets.

17. The one or more non-transitory computer-readable storage media of claim 11, wherein the chunk is transmitted to the service node using transmission control protocol (TCP).

18. A system comprising:
   a memory storing a scalable transfer agent application; and
   a processor coupled to the memory that executes the scalable transfer agent application by performing the steps of:
      determining a set of digital assets to transfer to a destination device;
      generating, from the set of digital assets, a corresponding set of chunks, wherein each chunk is a pre-defined size;
      for each chunk in the set of chunks:
         calculating a checksum value for the chunk,
         transmitting the chunk to a service node included in a set of service nodes,
         transmitting a message that includes the checksum value to the service node, and
         verifying that the service node received the chunk, wherein the set of service nodes receives at least two chunks of the set of chunks in parallel; and after the set of service nodes send the at least two chunks in parallel to the destination device, verifying, based on the checksum values for each chunk in the set of chunks, that the destination device received the set of chunks.

19. The system of claim 18, wherein verifying that the service node received the chunk comprises:

determining that the first checksum value for the chunk does not match a second checksum value that the service node calculates for the chunk; and retransmitting the chunk to the service node, wherein a third checksum value that the service node calculates for the chunk received from the retransmission matches the first checksum value for the chunk.

20. The system of claim 18, wherein verifying that the destination device received the set of chunks comprises:

calculating, for each chunk in the set of chunks, a checksum value;

determining whether each calculated checksum value matches a corresponding checksum value calculated by the destination device;

identifying a chunk corresponding to each non-matching checksum value; and causing the destination device to receive a retransmission of each identified chunk.

\* \* \* \* \*

UNITED STATES PATENT AND TRADEMARK OFFICE
CERTIFICATE OF CORRECTION

PATENT NO. : 11,936,717 B2
APPLICATION NO. : 17/528028
DATED : March 19, 2024
INVENTOR(S) : Shunfei Chen, Christopher Ginter and Victor Yelevich It is certified that error appears in the above-identified patent and that said Letters Patent is hereby corrected as shown below:

In the Claims

Column 24, Claim 2, Line 61, please delete "first";

Column 24, Claim 2, Line 67, please delete "first";

Column 26, Claim 12, Line 12, please delete "first";

Column 26, Claim 12, Line 18, please delete "first";

Column 27, Claim 19, Line 10, please delete "first";

Column 27, Claim 19, Line 16, please delete "first".

Signed and Sealed this
Fifteenth Day of October, 2024

Katherine Kelly Vidal
*Director of the United States Patent and Trademark Office*